United States Patent
Bacus et al.

(10) Patent No.: US 9,529,586 B1
(45) Date of Patent: *Dec. 27, 2016

(54) DIFFERENTIAL PATCHING OF CONTENT

(71) Applicant: AMAZON TECHNOLOGIES, INC., Reno, NV (US)

(72) Inventors: Michael Patrick Bacus, Seattle, WA (US); Garett Nell, Redmond, WA (US); Manoj Suresh Harpalani, Seattle, WA (US); Lokesh Joshi, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/671,978

(22) Filed: Mar. 27, 2015

Related U.S. Application Data

(63) Continuation of application No. 13/943,678, filed on Jul. 16, 2013, now Pat. No. 8,997,082.

(51) Int. Cl.
*G06F 9/44* (2006.01)

(52) U.S. Cl.
CPC .................................... *G06F 8/68* (2013.01)

(58) Field of Classification Search
CPC ........................................................ G06F 8/68
USPC ................... 717/169–177; 709/203
See application file for complete search history.

(56) References Cited

U.S. PATENT DOCUMENTS

| | | | |
|---|---|---|---|
| 6,230,316 B1* | 5/2001 | Nachenberg | G06F 8/68 717/169 |
| 6,449,764 B1 | 9/2002 | Sliger et al. | |
| 6,966,058 B2* | 11/2005 | Earl | G06F 8/65 709/223 |
| 6,976,062 B1* | 12/2005 | Denby | G06F 8/65 709/203 |
| 7,185,332 B1 | 2/2007 | Waldin et al. | |
| 7,191,436 B1* | 3/2007 | Durr | G06F 8/65 707/999.005 |
| 7,398,272 B2 | 7/2008 | Hindawi et al. | |
| 7,424,706 B2* | 9/2008 | Ivanov | G06F 21/57 713/176 |
| 7,509,636 B2* | 3/2009 | McGuire | G06F 8/68 709/217 |

(Continued)

OTHER PUBLICATIONS

Brown et al, "An Update on Software Updates", ACM, pp. 10-11, 2005.*

(Continued)

*Primary Examiner* — Anil Khatri
(74) *Attorney, Agent, or Firm* — Lindauer Law, PLLC

(57) ABSTRACT

Devices and techniques to incrementally update content associated with an electronic publication are described. A patch generation module may be configured to generate patch data files comprising incremental changes associated with the electronic publication. A differential patch module located on a client device may be configured to obtain the patch data files. The differential patch module may also be configured to compare the patch data files and the electronic publication and identify the differences between the files. Additionally, the differential patch module may be configured to update the changes in the patch data files with the content of the electronic publication. Accordingly, the electronic publication may be updated to include the changes in the patch data files.

20 Claims, 9 Drawing Sheets

(56) References Cited

U.S. PATENT DOCUMENTS

| | | | | |
|---|---|---|---|---|
| 7,603,668 | B2* | 10/2009 | Zweifel | G06F 8/65 717/168 |
| 7,676,506 | B2* | 3/2010 | Reinsch | G06F 8/68 707/695 |
| 7,685,591 | B2 | 3/2010 | Barr et al. | |
| 7,747,998 | B2 | 6/2010 | Napier et al. | |
| 7,814,473 | B2* | 10/2010 | Datta | G06F 8/65 717/168 |
| 7,814,476 | B2 | 10/2010 | Ho | |
| 7,823,147 | B2* | 10/2010 | Moshir | G06F 8/62 709/221 |
| 7,823,148 | B2 | 10/2010 | Deshpande et al. | |
| 7,849,131 | B2 | 12/2010 | Van De Sluis | |
| 7,900,202 | B2* | 3/2011 | Block | G06F 8/63 717/168 |
| 7,904,503 | B2 | 3/2011 | Van De Sluis | |
| 8,065,672 | B2 | 11/2011 | Sriram et al. | |
| 8,214,653 | B1 | 7/2012 | Marr et al. | |
| 8,245,216 | B2 | 8/2012 | Felts | |
| 8,341,513 | B1 | 12/2012 | Lattyak et al. | |
| 8,370,341 | B1 | 2/2013 | Cromwell et al. | |
| 8,407,687 | B2 | 3/2013 | Moshir et al. | |
| 8,418,168 | B2* | 4/2013 | Tyhurst | G06F 8/65 717/168 |
| 8,443,357 | B2* | 5/2013 | Nguyen | G06F 8/68 717/169 |
| 8,543,641 | B2* | 9/2013 | Cherukuri | G06Q 10/10 709/203 |
| 8,601,170 | B1 | 12/2013 | Marr et al. | |
| 8,645,939 | B2* | 2/2014 | Felts | G06F 8/60 709/223 |
| 8,677,348 | B1 | 3/2014 | Ramanathpura et al. | |
| 8,726,263 | B2 | 5/2014 | Rangarajan et al. | |
| 8,762,890 | B2* | 6/2014 | Falchuk | G06F 3/04815 715/782 |
| 9,038,657 | B2* | 5/2015 | Wilkinson | F02M 37/0052 123/514 |

OTHER PUBLICATIONS

Vojnovic et al, "On the Race of Worms, Alerts, and Patches", IEEE/ACM Transactions on Networking, vol. 16, No. 5, 1066-1079, 2008.*

Gerace et al, "The Critical Elements of Patch Management", ACM, pp. 98-101, 2005.*

Marinescu et al, "KATCH: High-Coverage Testing of Software Patches", ACM, pp. 235-245, 2013.*

Sethanandha, "Improving Open Source Software Patch Contribution Process: Methods and Tools", ACM, pp. 1134-1135, 2011.*

Higby et al, "Wireless Security Patch Management System", ACM, pp. 165-168, 2004.*

Park et al, "An Empirical Study of Supplementary Bug Fixes", IEEE, pp. 40-49, 2012.*

Burgy et al, "On Reconciling Patches and Aspects", ACM, pp. 1-5, 2009.*

Tucek et al, "Efficient Online Validation With Delta Execution", ACM, pp. 193-204, 2009.*

Andersen, et al., "Generic Patch Inference", IEEE, pp. 337-346, 2008.

Hicks, et al., "Dynamic Software Updating", ACM Transactions on Programming Languages and Systems, vol. 27, No. 6, pp. 1049-1096, Nov. 2005.

Hosek, et al., "Safe Software Updates via Multi-version Execution", IEEE, pp. 612-621, 2013.

Khatri, Anil, "Non-Final Office Action dated Aug. 8, 2014", U.S. Appl. No. 13/943,678, The United States Patent and Trademark Office, Aug. 8, 2014.

Khatri, Anil, "Notice of Allowance Dated Nov. 19, 2014", U.S. Appl. No. 13/943,678, The United States Patent and Trademark Office, Nov. 19, 2014.

Park, et al., "An Empirical Study of Supplementary Bug Fixes", IEEE, pp. 40-49, 2012.

* cited by examiner

DIFFERENTIAL PATCHING OF CONTENT

PRIORITY

This application is a continuation of, and claims priority to, pending U.S. patent application Ser. No. 13/943,678 filed on Jul. 16, 2013, entitled "Differential Patch of Content." The entirety of this previously filed application is hereby incorporated by reference.

BACKGROUND

Consumption of electronic books (eBooks), audio books, and other content continues to grow. The content may be accessed by a variety of client devices, such as smartphones, tablet computers, personal computers, wearable computers, and so forth.

Figure 1:
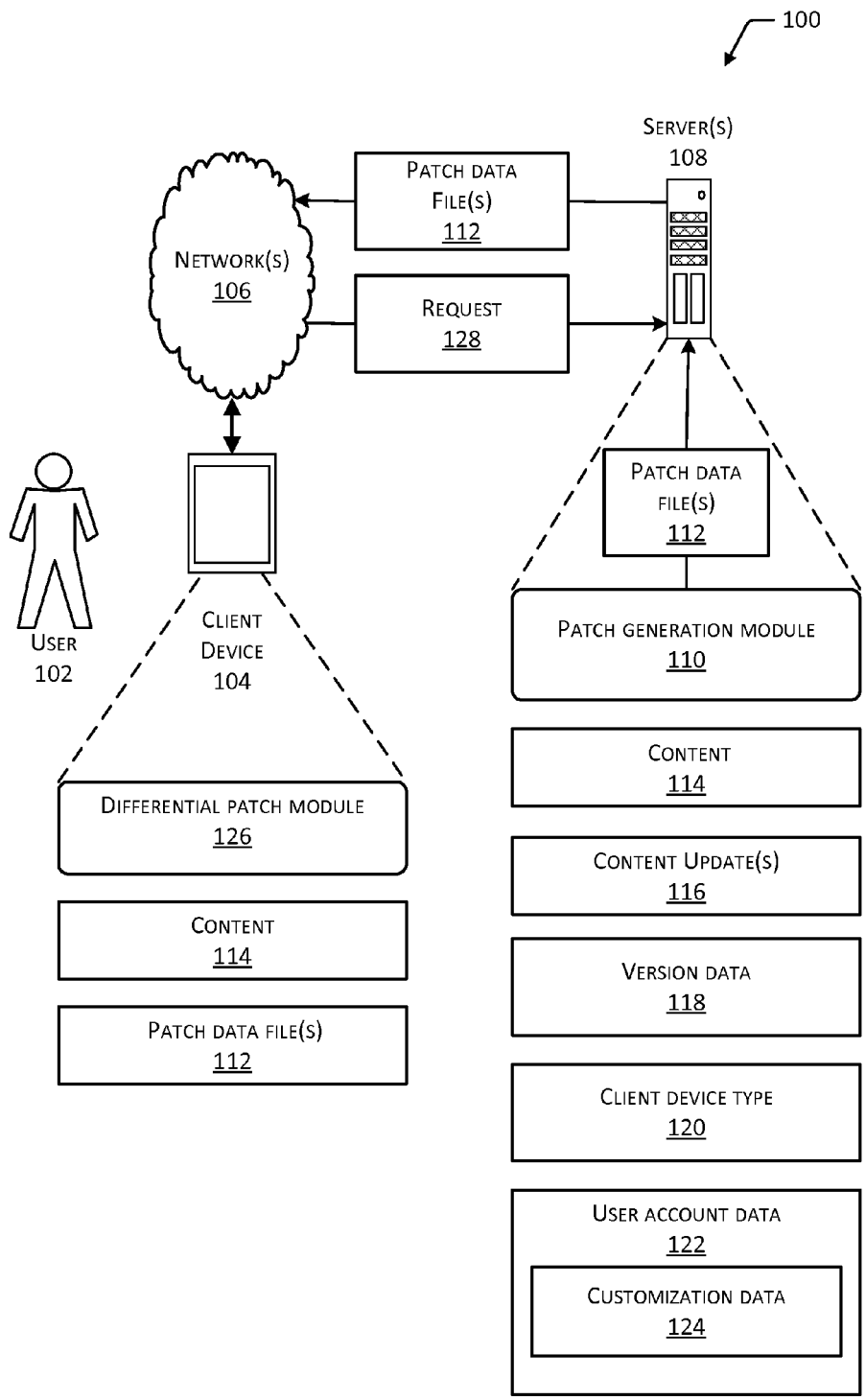
FIG. 1 depicts a system for updating content stored on client devices using patch data files, rather than resending an entire piece of content.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

A vast collection of content including electronic books (eBooks), audio books, magazines, periodicals, software applications, video games, encyclopedias, dictionaries, and so forth, are available for access using client devices. The content may include one or more files such as a data file, a metadata file, image file, font data, and so forth. The data file may include text, recorded audio, and so forth. The metadata file may include descriptive information about a particular data set, object, or resource. The metadata file may include formatting data, purpose of the data, time and date of creation of the data, creator or author of the data, location on a computer network where the data was created, and so forth. For example, a digital image file may include metadata that describes how large the picture is, the color depth, the image resolution, when the image was created, and other data. The client devices may include smartphones, tablet computers, personal computers, wearable computers, laptop computers, desktop computers, in-vehicle entertainment systems, and so forth.

After distribution, it may be desirable to make changes to the content as distributed. These changes may range from addressing errata in the form of typos in the original content, correcting formatting of style so that the content renders in a particular way on a device, to inserting new content, removing content, customizing content, and so forth.

Changing content once it has been delivered may be challenging due to how the content is distributed and stored. For example, eBooks may be distributed on the Internet as downloadable files that can be stored on a client device and read offline. Historically, changing content has involved re-delivering a new version of the entire content to all devices which have previously stored the content. For example, changing a single word in an eBook would call for retransmission of the entire eBook. This includes re-delivering data files, metadata files, and other information associated with the content. Transmission of this data may incur operational and financial costs.

This disclosure describes techniques and systems to change content that has been distributed to one or more client devices, without re-delivery of the entire content to those one or more client devices. A patch generation module uses content and content updates to generate one or more patch data files. The patch generation module processes the content updates by comparing the content updates to the content as previously delivered to the client device to generate one or more of the patch data files. The patch data files contain data representative of changes associated with the content. For example, content updates which include a change to the text may result in a patch data file for the data files storing the body of the eBook. Similarly, a change in formatting may result in a patch data file for the metadata file. The patch data files may be configured to add content, change presentation, correct errors, insert personalized content, redact content, and so forth.

A differential patch module is operable on the client device. The differential patch module accepts one or more patch data files from a computing device such as server, and modifies the content stored on the client device based on the one or more patch data files. As a result, the user of the client device now has access to the updated version of the content.

In one implementation, a user may download content such as an eBook, an audio book, and so forth onto the client device. At a later time, one or more patch data files comprising one or more revisions to the data file may be generated on the server. For example, the patch generation module may receive content updates from an author or publisher of the content correcting various errata, adding some additional material, and so forth. The patch generation module processes the content updates and generates one or more patch data files. The one or more patch data files are sent to the client device. The differential patch module of the client device accepts the patch data files and updates the content stored on the client device accordingly. This process allows for the content to be changed without retransmitting the entire content to the client device again.

In another implementation, the patch generation module may be configured to send a notification to the user that one or more patch data files associated with the content is available. The differential patch module stored on a client device may be configured to generate a user interface to facilitate receipt of a user input in response to the notification. For example, the user may be able to specify with the user interface whether to receive the patch data files comprising the revisions associated with the content automatically or provide the user input to manually request the patch data files.

The differential patch module may be configured to update the content when the size of the patch data file is smaller than the size of the content. Accordingly, the entire content would be replaced only when the size of the one or more patch data files for that content is greater than or equal to the size of the content. Because the patch data files may be smaller than the size of the entire piece of content, the amount of data transferred may be significantly reduced, resulting in a corresponding reduction in costs and so forth.

Illustrative System

FIG. 1 depicts a system 100 for updating content stored on a client device using one or more patch data files. By using one or more patch data files, rather than retransmitting the entire piece of content, overall costs associated with distributing the updates may be reduced.

A user 102 may interact with a client device 104. A single user 102 and client device 104 are depicted here for ease of illustration, and not by way of limitation. In other implementations, a plurality of client devices 104 may be present. The client devices 104 may include desktop computers, a laptop computers, tablet computers, smartphones, wearable computers, set-top box, media players, in-vehicle systems, and so forth. The client device 104 is coupled to a network 106.

The client device 104 may connect to one or more networks 106 that provide access to one or more servers 108 or other devices. The networks 106 may include public networks such as the Internet, private networks such as an institutional and/or personal intranet, or some combination of private and public networks. The networks 106 may also include any type of wired and/or wireless network, including, but not limited to, local area networks (LANs), wireless local area networks (WLANs) such as Wi-Fi™, wide area networks (WANs), wireless wide area networks (WWANs) such as 3G, 4G, LTE, and so forth. The networks 106 may utilize communications protocols such as internet protocol (IP), transmission control protocol (TCP), user datagram protocol (UDP), or other types of protocols.

Each of the servers 108 may comprise a patch generation module 110 configured to generate and send patch data files 112 comprising incremental changes associated with content 114 to the client device 104. The content 114 may include one or more files such as a data file, a metadata file, image file, font data, audio file, and so forth. The data file may include text, recorded audio, and so forth. The metadata file may include descriptive information about a particular data set, object, or resource. The image file may include data which is configured to be rendered as a picture. In most implementations, a total file size of the one or more patch data files 112 as delivered to the client device 104 is less than a total file size of the content 114 previously stored on the client device 104.

The patch generation module 110 accesses information, such as one or more of the following: content updates 116, version data 118, a client device type 120, or user account data 122. User account data 122 may also include customization data 124.

The content updates 116 comprise information associated with the one or more changes to the content 114. The content updates 116 may be associated with a particular version or revision of the content 114. For example, the content updates 116 may include changes for the $2^{nd}$ edition of an eBook. The content updates 116 may include a markup language or other data which indicates particular changes to be made in the content 114. In some implementations, the content updates 116 may include an entire piece of content 114. For example, a publisher may send a complete version of the eBook as the content update 116, rather than a file describing only the changes.

The version data 118 indicates a particular version, edition, revision, or other designation of the content 114. For example, the version data 118 may indicate the content 114 distributed to the client device 104 was version "1.2", as distinct from version "1.3" which may have different end papers.

The client device type 120 provides information about the client device 104 such as a particular make, model, chassis, capability, and so forth. For example, the client device type 120 may indicate that a particular client device 104 has a color display rather than a black and white display. The patch generation module 110 may provide patch data files 112 specific to a particular type of device. Continuing the example, the client device 104 with only a black and white display may receive images which are monochrome and not color.

The user account data 122 provides information about the one or more users 102. For example, the user account data 122 may include information registering a particular client device 104 to a user account of the user 102, payment information for the account, and so forth.

The customization data 124 provides information associated with a particular user 102 or group of users 102(U). For example, the customization data 124 may include access codes or other credentials for a particular user 102 which allow for access of additional content. The customization data 124 may include one or more of access codes, usernames, passwords, and so forth. In some implementations, the patch generation module 110 may provide patch data files 112 based on the customization data 124. For example, a particular group of users 102(U) may use an access code to enroll in the same anatomy class. However, each user 102 of the group may have a different version of the textbook associated with the anatomy class downloaded on their respective client device 104. For example, the content 114 associated with the textbook may be translated into different languages. Additionally, each user 102 of the group may have downloaded the content 114 on different types of client devices 104. Accordingly, the patch generation module 110 may generate and distribute the patch data files 112 across the various types of client devices 104. Additionally, the patch data files 112 may be associated with multiple versions of content 114. Therefore, the scope of the revisions provided by the patch generation module 110 may be independent of the type of client device 104 and independent of the version of content 114.

The patch generation module 110 is configured to generate one or more patch data files 112. The patch data files 112 may comprise incremental changes or updates associated with the content 114 based on one or more of the content updates 116, version data 118, the client device type 120, user account data 122, or other data. For example the patch generation module 110 may receive version data 118 associated with the content 114.

Based on the version data 118, the patch generation module 110 may generate one or more patch data files 112 comprising incremental changes to the content 114. For example, the changes may correct typos in the original content 114, correct formatting of style so that the content 114 renders in a particular way on the client device 104, insert new content 114, remove content 114, customize content 114, and so forth. The patch data file 112 may include one or more of an image file, a text file, a metadata file, a hypertext markup language (HTML) file, an audio file, and so forth. The content updates 116 and the corresponding patch data file 112 may be configured to remove information from the content 114 during the modification. For example, an erroneous word or paragraph may be deleted.

The patch generation module 110 may generate the patch data files 112 using one or more techniques. These techniques may include a byte-level comparison of one version of the content 114 with another. For example, the previously distributed version of the content 114 may be compared with a new version received in the content update 116. Based on the differences between these versions, one or more patch data files 112 may be generated. Another technique may be comparison of metadata, internal item, object versioning, or reference numbers. For example, metadata associated with image files may indicate that one image file has a greater version number, and may thus be deemed to be included in the patch data file 112. Another technique may be simple replacement, such that any data included in the content update 116 supersedes or replaces elements that have the same or similar identifiers within the content 114. Another technique may involve generating patch data files 112 based on the capabilities of the client device 104. For example, the patch generation module 110 may determine that the client device 104 does not have audio capability. Accordingly, the patch generation module 110 may not provide patch data files 112 that include an audio file for that particular client device 104. Another technique may involve configuring the client device 104 to generate and send patch data files 112 to another client device 104 using peer-to-peer technology. For example, the user 102 may make annotations to the content 114. The client device 104 may generate and send the patch data files 112 that include the annotations to another client device 104. To this end, patch data files 112 may be generated in order to keep documents, notes, highlights, bookmarks, and so forth, up-to-date across multiple client devices 104. These techniques, or others, may be used individually or in combination with one another to generate the patch data files 112.

Additionally, the patch generation module 110 may transmit the patch data files 112 over one or more networks 106. Traditionally, costs associated with delivering data using Wi-Fi™ are nominal. Conversely, transferring data over a wireless broadband network may accrue costs on a per-megabyte basis. Because there are costs associated with transmitting the patch data files 112 over a particular network 106, the patch generation module 110 may be configured to determine which network 106 to use to deliver the patch data files 112. This determination may be based on a variety of factors, such as, whether the patch data files 112 contain time sensitive data, the speed of the network 106, the latency of the network 106, transmission costs associated with the network 106, and so forth. For example, based at least in part on a subset of the aforementioned factors, the patch generation module 110 may make a determination to send the patch data files 112 over a network 106 that uses Wi-Fi™ technology instead of a 3G broadband network connection.

The content 114 may be customized using the patch generation module 110. The patch generation module 110 may be configured to access the customization data 124 and generate patch data files 112 associated with a particular user 102 or client device 104. The customized patch data files 112 may be delivered to the particular client device 104 registered or associated with the user 102. The user 102 may access the content 114 which has been updated based on the patch data files 112 and see content 114 tailored specifically for them. For example, where the user 102 is a medical student, hyperlinks within an eBook may be customized to allow for access within the eBook using the student's account login information.

The patch generation module 110 may be configured to send a notification to the user 102 that one or more patch data files 112 associated with the content 114 is available. The notification may include details associated with additional content 114 in the patch data files 112, the type of content 114 in the patch data files 112, the size of the patch data files 112, the rationale for providing the patch data files 112, and so forth. For example, the notification may include information describing the differences between the version of the content 114 available on the client device 104 and the patch data files 112 generated by the patch generation module 110. Alternatively, the differential patch module 126 may be configured to automatically obtain one or more patch data files 112 from the server 108 without any notification.

Upon receiving the notification, the differential patch module 126 stored on the client device 104 may be configured to generate a user interface to facilitate receipt of a user input in response to the notification. For example, using the user interface, the user 102 may be able to specify whether to receive the patch data files 112 comprising the revisions associated with the content 114 automatically or provide the user input to send a request 128 to the server 108 for the patch data files 112. For example, the user 102 may send the request 128 to the server 108 requesting the patch data files 112 are sent to the client device 104 automatically whenever new patch data files 112 are available for download. In response to the request 128, the server 108 may be configured to send the patch data files 112 to the differential patch module 126. The differential patch module 126 may be configured to download the patch data files 112 onto the client device 104. The differential patch module 126 may also compare the content 114 and the patch data files 112 and identify the differences between the files. The differential patch module 126 may then update the content 114 based on the patch data files 112. Once the content 114 is updated, the content 114 may include the revisions associated with the patch data files 112. Therefore, the content 114 may be changed incrementally instead of replacing the entire content 114. Accordingly, the costs associated with distributing changes to the user 102 that had previously downloaded the content 114 associated with an eBook, an audio file, and so forth, may be reduced.

Figure 2:
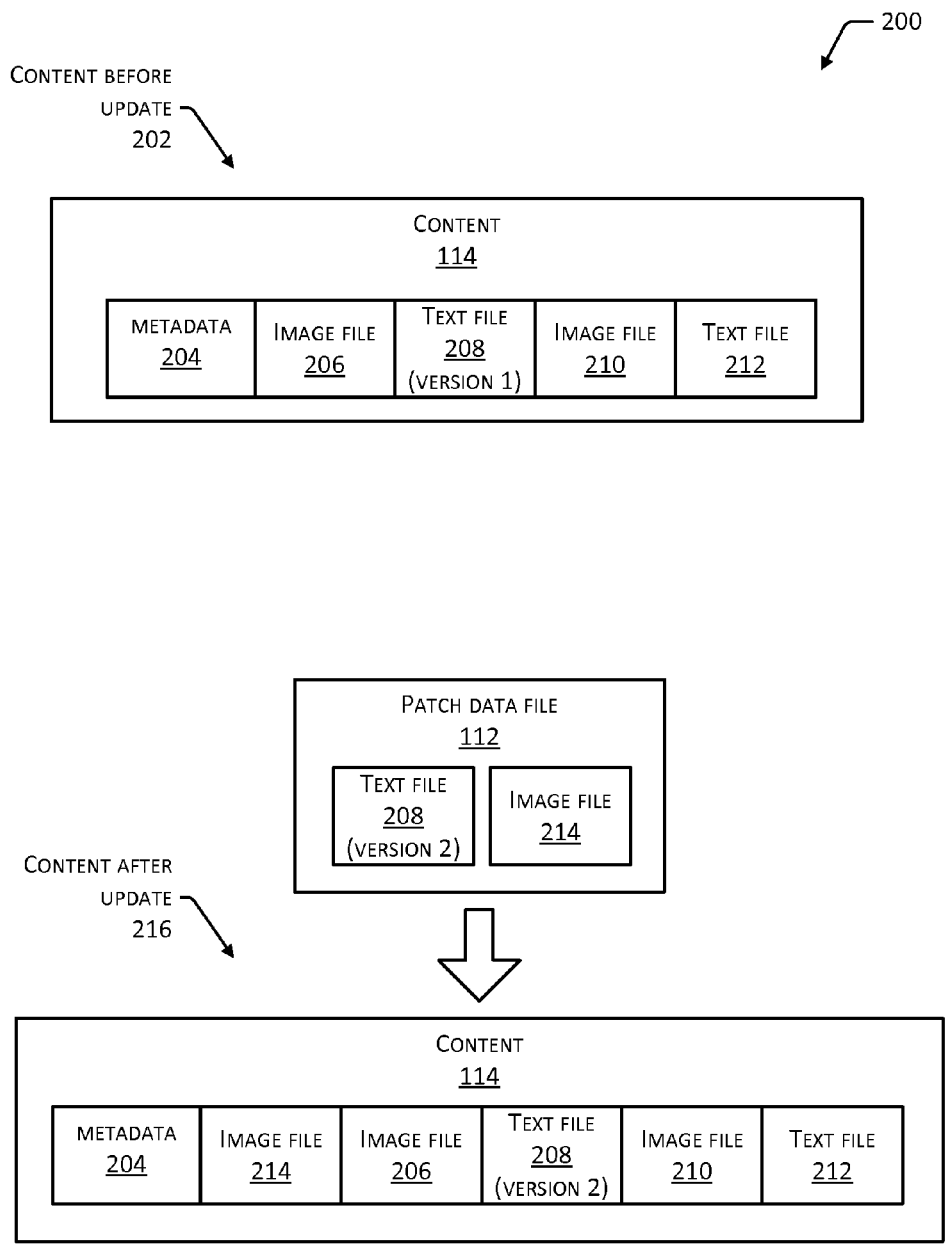
FIG. 2 depicts a schematic of updating the content using the patch data files.

FIG. 2 depicts a schematic 200 of updating the content 114 with one or more patch data files 112. As described above, the update of the content 114 may be performed by the differential patch module 126.

As described above, the user 102 may download content 114 such as an eBook onto the client device 104. As illustrated here, the content 114, as downloaded and before the update 202, may include metadata 204, an image file 206, a first version of a text file 208, another image file 210, and another text file 212.

In this illustration, the author of the content 114, or another party, has updated the text file 208 to create a second version. This second version may correct various typos, include additional text, remove some text, and so forth, relative to the first version. The author may also have added a new picture to be included in the eBook. The author may have provided a content update 116, which indicates the changes to be made, or the author may have re-sent the entire piece of content 114 including the updates, to the patch generation module 110. For example, the patch generation module 110 may receive a second version of the text file 208 and an image file 214 of the new image.

Based at least in part on the content update 116, the patch generation module 110 generates the patch data file 112. In this example, the patch data file 112 includes the second version of the text file 208 and the image file 214 for the new image. The patch data file 112 is provided to the client device 104. The differential patch module 126 executing at least in part on the client device 104 uses the patch data file 112 to replace the first version of the text file 208 with the second version, and insert the image file 214 into the content 114, forming the content after update 216. As a result, the user 102 may now use the client device 104 to access the updated version of the content 114 with the errors corrected and the new image added. As described above, the patch data files 112 may be obtained automatically or manually in response to the request 128 from the client device 104. Using these techniques, it becomes unnecessary in many instances to resend the entire piece of content 114 that would otherwise incur fiscal and bandwidth costs.

Figure 3:
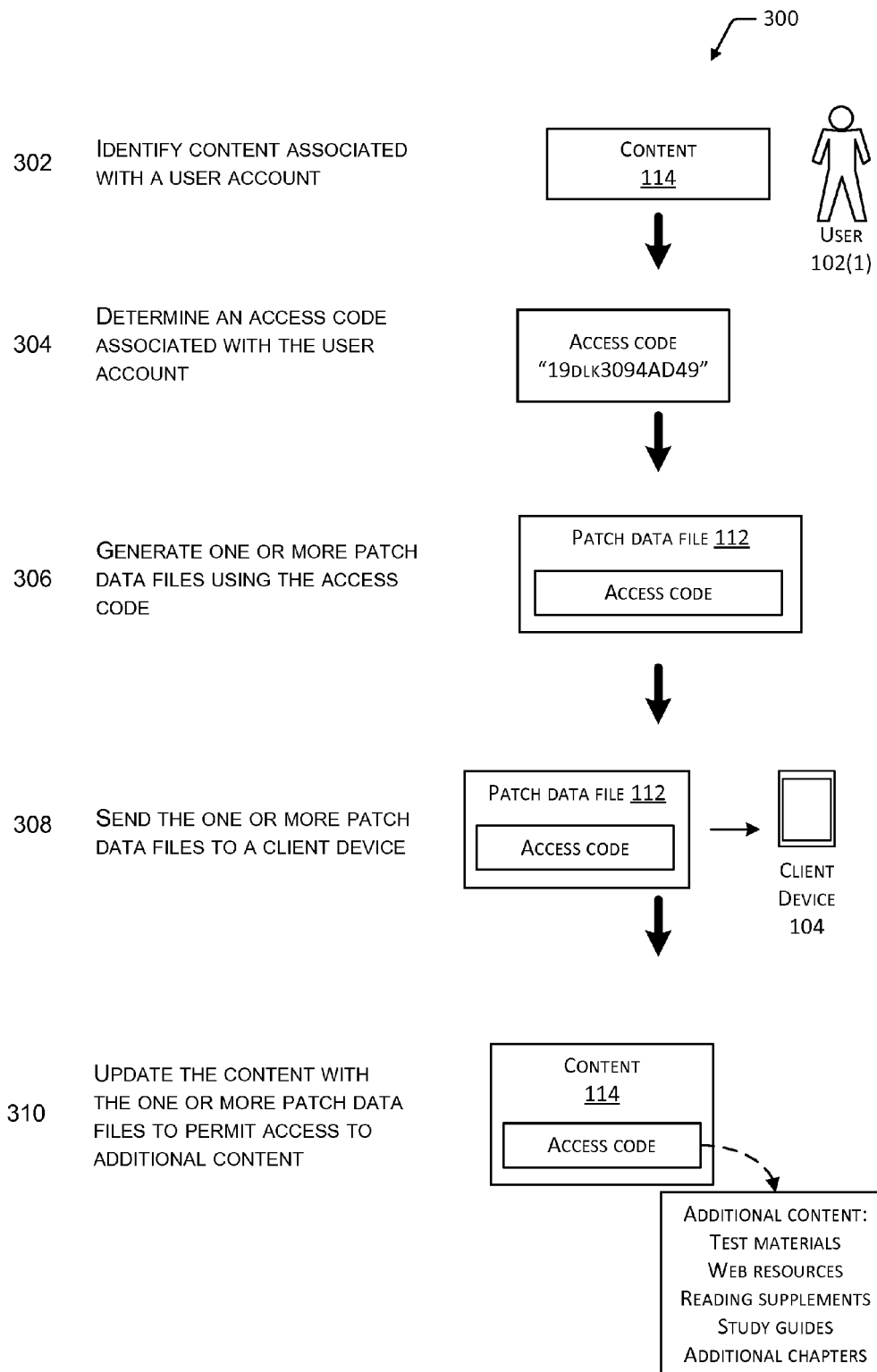
FIG. 3 illustrates a scenario of generating a patch data file incorporating customized data.

FIG. 3 illustrates a scenario 300 of generating the patch data file 112 which incorporates customized data. This scenario may be performed at least in part by one or more of the patch generation module 110, the differential patch module 126, or other modules.

At 302, the content 114 associated with a user account for a user 102 is identified. For example, the content 114 may be an eBook "Vertebrate Anatomy" which has been associated with the user account for the user 102 of "Alice". This eBook may include hyperlinks to additional content, such as videos or interactive lessons which are available behind a paywall.

At 304, an access code associated with the user account is determined. The access code may comprise a username, a password, authentication credentials, hash, combination of characters or digits, and so forth. The determination may include requesting the information from the user 102 through a user interface, retrieving the information as previously stored, and so forth.

The access code may enable access to the additional content or features associated with the content 114. In some implementations, the access code may be included as part of the metadata 204 in the patch data files 112. The metadata 204 may include caching parameters, permissions associated with various pieces of the content 114, and so forth. The patch generation module 110 may be configured to use the caching parameters to pre-fetch content 114 before the user 102 has requested the content 114. The patch generation module 110 may be configured to select and download content 114 to the user's 102 client device 104 based on the user's 102 prior interests, generally popular items, and so forth. For example, the patch generation module 110 may determine that the user preferences for eBook content included works created by the author John Grisham. The patch generation module 110 may send the content 114 associated with the latest John Grisham novel to the user's 102 client device 104 prior to the user 102 requesting the content 114. Continuing with this example, when the user 102 requests access to the content 114, the patch data files 112 may be provided that include an access code enabling access to the content 114.

The permissions may include time-based permissions, temporary access permissions, full access permissions, and so forth. To this end, the differential patch module 126 may be configured to store encrypted data alongside non-encrypted data. For example, the user 102 "Alice" may have download the content "Vertebrate Anatomy", but at the time of download did not have access to the additional content behind the paywall. Continuing with this example, when the user 102 "Alice" has acquired sufficient rights, such as by enrolling in a class or paying a fee, an access code enabling access to the additional content may be provided.

At 306, one or more patch data files 112 are generated using the access code or other customization data 124. For example, the patch data files 112 may include the access code associated with the user 102 of "Alice".

At 308, the one or more patch data files 112 are sent to the client device 104 associated with the user 102. For example, the server 108 may use the network 106 to send the one or more patch data files 112 to the eBook reader client device 104.

At 310, the content 114 is updated with the one or more patch data files 112. For example, the differential patch module 126 may apply the patch data files 112 to the content 114 such that the copy of "Vertebrate Anatomy" for the user 102 "Alice" now includes Alice's login information. As Alice reads the eBook "Vertebrate Anatomy" and selects various hyperlinks, she is provided with the content 114 behind the paywall as enabled by the access code. Accordingly, after the content 114 is updated, the user 102 may access the additional content 114 or features associated with the patch data files 112.

The patch data files 112 may comprise customized data associated with the user 102 and based on the customization data 124. The customization data 124 may include a variety of other types of data, which may be used to modify the content 114. The customization data 124 may include video files, audio files, image files, text files, markup language files, digital autographs, digital signature, a recordable message, or other personalized data such as the access code mentioned above. The patch data files 112 containing the customized data may be sent to the client device 104 and the content 114 may be updated such that the content 114 includes the customized data associated with the patch data files 112.

Figure 4:
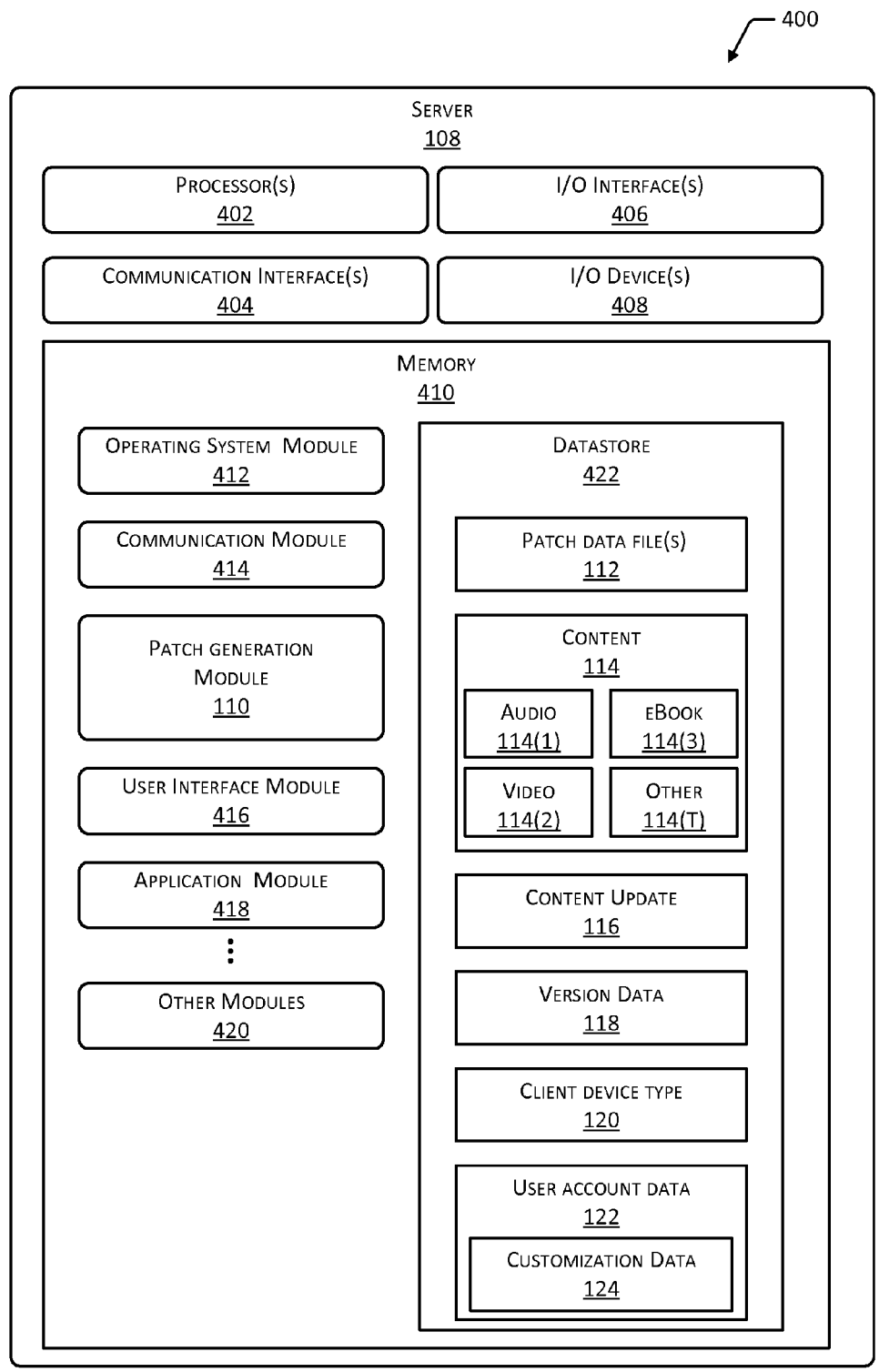
FIG. 4 depicts a block diagram of a server configured to generate patch data files comprising incremental changes to content.

FIG. 4 depicts a block diagram 400 of a server 108 comprising the patch generation module 110. The server 108 may include one or more processors 402 configured to execute one or more stored instructions. The processors 402 may comprise one or more cores.

The server 108 may also include one or more communication interfaces 404 to enable communications between the server 108 and other networked devices. Such communication interface(s) 404 may include one or more network interface controllers (NICs) or other types of transceiver devices configured to send and receive communications over the network(s) 106. The server 108 may also include one or more busses or other internal communications hardware or software that allow for the transfer of data between the various modules and components of the server 108.

The server 108 may include one or more input/output (I/O) interface(s) 406 to allow the server 108 to communicate with other devices. These I/O interfaces 406 may include an inter-integrated circuit (I2C), serial peripheral interface bus (SPI), Universal Serial Bus (USB) as promulgated by the USB Implementers Forum, RS-232, and so forth. The I/O interface(s) 406 may couple to one or more I/O devices 408. The I/O devices 108 may include keyboards, displays, printers, and so forth. In some embodiments, the I/O device(s) 408 may be physically incorporated with the server 108 or be externally placed.

The server 108 includes one or more memories 410. The memory 410 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 410 provides storage of computer readable instructions, data structures, program modules, and other data for the operation of the server 108.

The memory 410 may include at least one operating system (OS) module 412. The OS module 412 is configured to manage hardware resources such as the I/O interface(s) 406 and communication interface(s) 404, and to provide various services to applications or modules executing on the processor(s) 402. Also stored in the memory 410 may be one or more of the following modules. These modules may be executed as foreground applications, background tasks, daemons, and so forth.

The memory 410 may include a communication module 414, a patch generation module 110, a user interface module 416, an application module 418, or other module(s) 420. The communication module 414 is configured to maintain communication with other devices, such as the client device 104, another server 108, and so forth, using one or more of the communication interfaces 404.

As described above, the patch generation module 110 may be configured to generate and send one or more patch data files 112 comprising incremental changes associated with the content 114 to the client device 104. The patch data files 112 may include an audio file, a video file, an image file, a text file, a HTML file, and so forth. In one implementation, the patch generation module 110 may be configured to generate one or more patch data files 112 comprising incremental changes or updates associated with the content 114 based on one or more of the content updates 116, the version data 118, the client device type 120, user account data 122, or other data. For example, the patch generation module 110 may identify the client device type 120 that has downloaded and stored the content 114. Based on the client device type 120, the patch generation module 110 may generate one or more patch data files 112 comprising incremental changes to the content 114.

Additionally, the patch data files 112 or portions thereof may be personalized using the customization data 124. For example, the customization data 124 may contain information that associates the content 114 with a particular user 102, a particular entity, and so forth. Based on the particular user 102 or particular entity, the patch generation module 110 may be configured to generate a digital autograph, a digital signature, a recordable message, or other personalized message. For example, an author of an eBook may be able to create a dedicated signature with a personalized message for each respective user 102 that has downloaded the content 114. The patch generation module 110 may be configured to generate one or more patch data files 112 that include the dedicated signature and transmit the patch data files 112 to the client device 104.

The patch generation module 110 may also be configured to generate patch data files 112 that include an access code or other credentials that enable access to additional content 114. For example, some educational institutions may require an access code such as a username, a password, and so forth, in order for the user 102 to be able to access additional content 114 associated with an electronic textbook such Web resources, test materials, supplemental reading materials, and so forth.

The memory 410 may also comprise a user interface module 416. The user interface module 416 may be configured to provide a user interface such as an application programming interface, web page, or other interface to the user 102, the client devices 104, other devices, and so forth.

The memory 410 may store one or more application modules 418. The application modules 418 may provide various functionalities such as handling initial distribution of the content 114 to the client devices 104, account management, billing, and so forth.

Other modules 420 may also be present, such as a version update module. The version update module may be configured to update the version number of the content 114 upon a determination that the number of updates included in the patch data files 112 has exceeded a threshold number of updates. For example, the version update module may be configured to maintain a history of the updates included in the patch data files 112 associated with a respective version of the content 114. Upon a determination that the number of updates has exceeded a threshold amount, the version number associated with the content 114 may be increased, modified, or otherwise changed.

The modules in this disclosure are described as separate modules for convenience and not by way of limitation. In some implementations, at least a portion of the functionality of these modules may be combined into a single module, incorporated into another module, and so forth. In some implementations, the functionality of the server 108 may exist across one or more devices.

The memory 410 may also include a datastore 422 to store information for operations of the server 108. The datastore 422 may comprise a database, array, structured list, tree, or other data structure. In some implementations, the datastore 422 may store at least a portion of the content 114, content updates 116, the version data 118, the client device type 120, the user account data 122, the customization data 124, and so forth. As described above, the content 114 may include audio data 114(1), video data 114(2), an eBook 114(3), or other data 114(T). The datastore 422 may store other data (not depicted) such as user preferences, user interface elements, and so forth.

Figure 5:
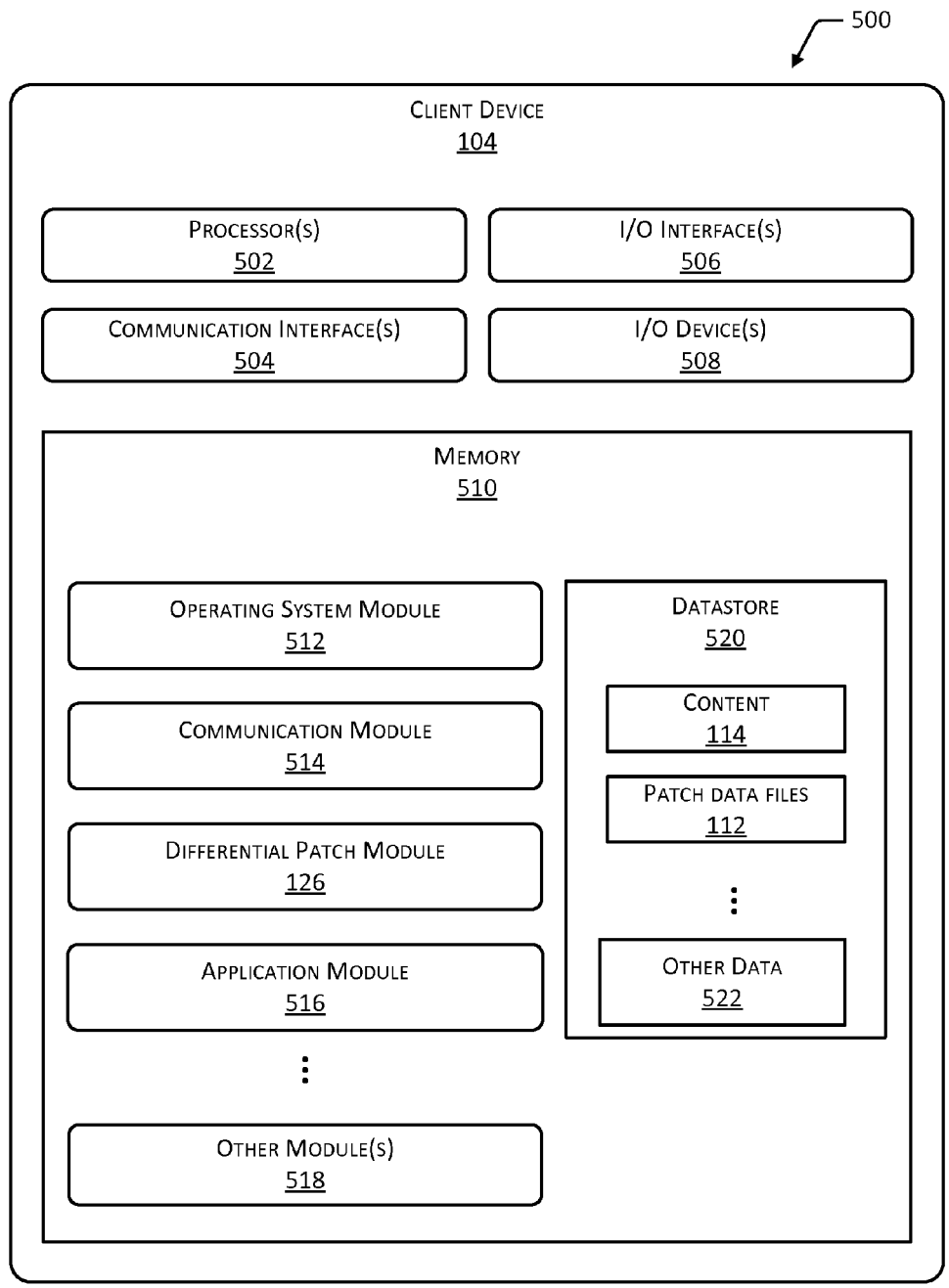
FIG. 5 depicts a block diagram of a client device that may be configured to update content using the patch data files.

FIG. 5 depicts a block diagram 500 of the client device 104 that may be configured to implement the differential patch module 126 described above. The client device 104 may include one or more processors 502 configured to execute one or more stored instructions. The processors 502 may comprise one or more cores.

The client device 104 may also include one or more communication interfaces 504 configured to send and receive communications over the network(s) 106.

Similar to the server(s) 108, the client device 104 may include one or more I/O interfaces 506 to allow the client device 104 to communicate with other devices such as those shown in FIG. 1. In some embodiments, the I/O interface(s) 506 may be configured to provide a USB connection. The client device 104 may also include one or more busses or other internal communications hardware or software that allow for the transfer of data between the various modules and components of the client device 104.

The I/O interface(s) 506 may couple to one or more I/O devices 508. The I/O device(s) 508 may include user input devices such as one or more of a keyboard, a mouse, a pen, a game controller, microphone, a touch input device, a gestural input device, one or more accelerometers, one or more gyroscopes, the server(s) 108, and so forth. The I/O device(s) 508 may include output devices such as one or more of a display, a printer, audio speakers, haptic output device, and so forth. In some embodiments, the I/O device(s) 508 may be physically incorporated with the client device 104 or be externally placed.

As shown in FIG. 5, the client device 104 includes one or more memories 510. The memory 510 comprises one or more CRSM, as described above in FIG. 4. The memory 510 may include at least one OS module 512. The OS module 512 is configured to manage hardware resources such as the I/O interface(s) 506 and communication interface(s) 504, and to provide various services to applications or modules executing on the processor(s) 502. The OS module 512 may comprise one or more mobile operating systems configured for execution on mobile computing devices. The memory 510 may include the communication module 514, the differential patch module 126, an application module 516, or other module(s) 518.

The communication module 514 is configured to maintain communication with other devices. The communication module 514 may be configured to send, receive, or send and receive data with another client device 104, another server 108, and so forth, using one or more of the communication interfaces 504.

As described above, the differential patch module 126 may be configured to accept one or more patch data files 112 and update the content 114 stored in the memory 510 from the server 108. The differential patch module 126 may be configured to maintain or transfer user 102 annotations including highlights, bookmarks, notes, and so forth, such that these annotations remain accessible to the user 102 after the update of the content 114.

The user 102 may perform various customizations to the content 114 stored on the client device 104 by creating annotations such as highlights, bookmarks, notes, and so forth. The differential patch module 126 may be configured to process the patch data files 112 such that annotations are retained and accessible in conjunction with the content 114.

In other implementations, the patch generation module 110 may be configured to generate patch data files 112, which include the annotations as customization data 124. Therefore, when the content 114 is updated with the patch data files 112, the user's 102 annotations remain available in the content 114.

The differential patch module 126 may be configured to determine the user's 102 position last accessed within the content 114, such as the reading position, and maintain that position information following application of the patch data files 112. For example, the user's 102 reading position in the eBook may be stored and updated once the content 114 has been updated. The differential patch module 126 may also be configured to determine whether the content 114 is currently being accessed by the client device 104. In some implementations, the differential patch module 126 may disallow an update of a portion of the content 114 associated with the patch data file 112 at the location currently being accessed by the user's 102 client device 104. For example, the differential patch module 126 may determine a portion of the content 114 is currently being accessed by the client device 104 and presented on the display. Based on the determination, modification of the content 114 by the one or more patch data files 112 for other portions of the content may be permitted. In other implementations, the differential patch module 126 may be configured to determine the user's 102 current reading location and allow an update of a portion of the content 114 associated with the patch data file 112 at the location currently being accessed by the user's 102 client device 104.

The application module 516 may include one or more of a web browser, eBook reader application, media player application, and so forth. For example, the application module 516 may comprise a plurality of libraries or executable modules, which may provide functionality to present the content 114 on a display.

The memory 510 may also include other modules 518. The other modules 518 may include a digital rights management module configured to support one or more digital rights schemes associated with access to the content 114.

The memory 510 also includes a datastore 520 to store information associated with operation of the client device 104. The datastore 520 may comprise a database, array, structured list, tree, or other data structure. The datastore 520 may store the content 114, the patch data files 112, and so forth. Other data 522 may also be stored in the datastore 520, such as user preferences, device settings, and so forth.

The modules of the client device 104, the server 108, and so forth, are described in this disclosure as separate modules. In some implementations at least a portion of the functionality of these modules may be combined into a single module, or incorporated into another module. Furthermore, in some implementations, the client device 104 and the server 108 may be operated within an organization, particular network 106, and so forth.

Figure 6:
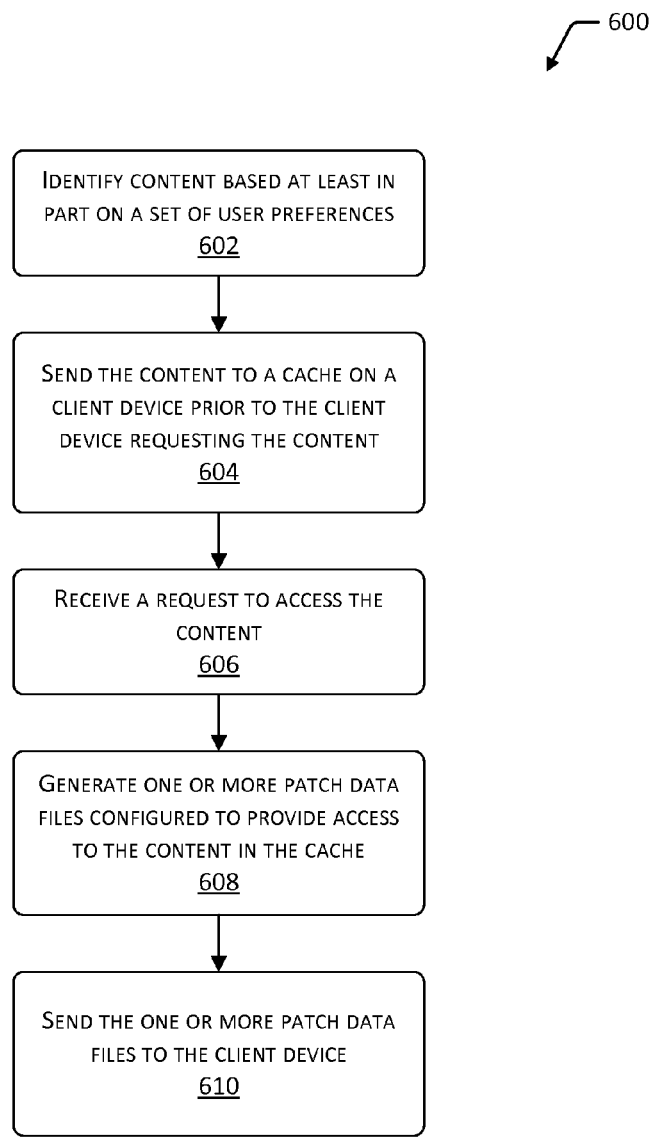
FIG. 6 depicts a flow diagram of a process by the patch generation module to provide one or more patch data files configured to provide access to the content that has been pre-loaded onto a client device.

FIG. 6 depicts a flow diagram 600 of a process by the patch generation module 110 to provide patch data files 112 which allow access to the content 114 that has been pre-loaded onto the client device 104. The content 114 may be pre-selected based on a set of user preferences and loaded into the cache associated with the client device 104 to be accessed at a later time by the user 102.

At block 602, the patch generation module 110 identifies content 114 based at least in part on a set of user preferences associated with one or more client devices 104. For example, the user account data 122 may include a user preference for books about the history of music. The patch generation module 110 may identify content 114 associated with music history such as, "Biography of Elvis Presley."

At block 604, the patch generation module 110 is configured to send the content 114 identified as corresponding to the user preferences to a cache associated with the client device 104. For example, the book "Biography of Elvis Presley" may be sent to the client device 104 and stored in the cache. In some implementations, the content 114 may be sent to the cache associated with the client device 104 prior to the client device 104 requesting the content 114. The content 114 as sent may be configured to be inaccessible to the user 102, the client device 104, or both. For example, the content 114 may be encrypted, locked, have permissions set which prevent presentation on the display, and so forth.

At 606, the patch generation module 110 may receive a request for the client device 104 to access the content 114. For example, a user 102 may use the client device 104 to submit a request to purchase or otherwise acquire access to the content 114.

At 608, when the user 102 requests access to the content 114 using the client device 104, the patch data files 112 may be provided that include an access code enabling access to the content 114 previously stored in the cache. For example, once the user 102 has acquired sufficient rights, one or more patch data files 112 configured to enable access to the pre-loaded content 114 may be provided.

The patch data files 112 may also include other information, such content updates 116 that have been released since the sending of the content 114 to the cache. The one or more patch data files 112 may have a total file size in aggregate which is less than that of the content file size. In other words, the one or more patch data files 112 may be smaller than the content 114.

At 610, the one or more patch data files 112 are sent to the client device 104 or other device. For example, the server 108 may use the network 106 to send the patch data files 112 to the client device 104. As described above, the differential patch module 126 accepts the patch data files 112 and permits access to the content 114 accordingly. Continuing the example, the content 114 may be rendered accessible by decrypting the encrypted content 114.

Figure 7:
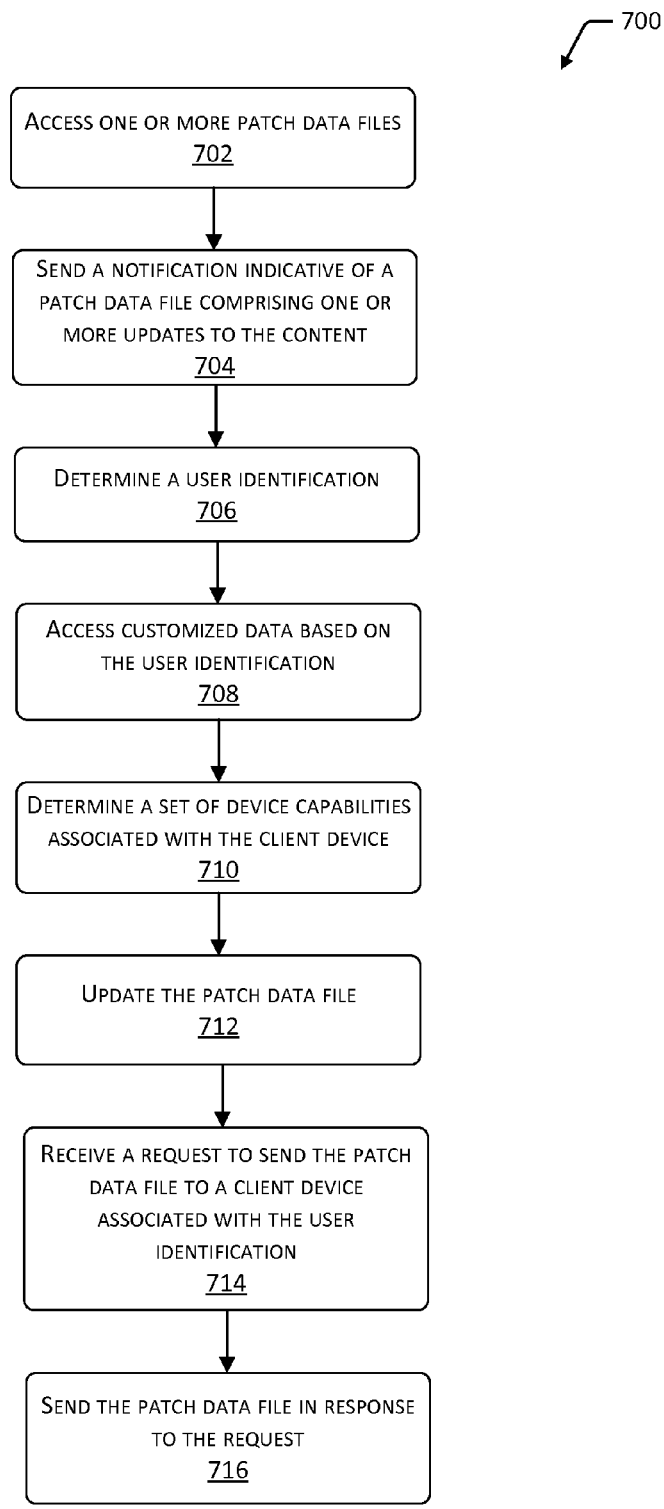
FIG. 7 depicts a flow diagram of a process of accessing and using patch data files which include customized data to access additional content.

FIG. 7 depicts a flow diagram 700 of a process by the patch generation module 110 of accessing customization data 124 to include in the patch data file 112. For example, the patch data files 112 may include customization data 124 associated with a particular user 102, a particular entity, and so forth.

At block 702, one or more patch data files 112 may be accessed. For example, the patch data files 112 generated as described above with regard to FIG. 6 may be retrieved from memory of the client device 104, the server 108, or another device.

As described above, in some implementations, a notification may be sent indicating updates to the content 114 are available. At block 704, the patch generation module 110 sends a notification to the client device 104 that one or more patch data files 112 associated with the content 114 is available. For example, the notification may include information describing what the differences are between the content 114 and the patch data files 112. In one implementation, the patch generation module 110 may be configured to determine whether the patch data files 112 include a threshold number of updates and based on the determination, send the notification to the client device 104.

At block 706, the patch generation module 110 determines a user identification corresponding to the user 102. For example, the user identification may include associating a particular user 102 with corresponding user account data 122.

At block 708, the patch generation module 110 accesses customization data 124 based on the user identification. For example, the customization data 124 may comprise an image file, an audio file, a video file, a text file, a HTML file, or other file associated with a particular user 102, a particular entity, and so forth, as specified in the customization data 124.

At block 710, the patch generation module 110 may configured to determine a set of device capabilities associated with the type of client device 104. For example, the patch generation module 110 may determine that the client device 104 does not have audio capability.

At block 712, the patch generation module 110 may be configured to generate or update the patch data file 112 based at least in part on the customization data 124, the type of client device 104, the set of device capabilities associated with the client device 104, or a combination of these factors. For example, the customization data 124 may include video files, audio files, image files, text files, markup language files, digital autographs, digital signatures, recordable messages, or other data such as the access code mentioned above. The patch data files 112 may be updated to include the customization data 124. For example, the patch data file 112 may include the dedicated signature from the author.

As described, in some implementations, delivery of the patch data files 112 may be based upon the client device 104 sending the request 128 to the server 108. At block 714, the patch generation module 110 receives the request 128 to send the patch data file 112 to a client device 104 associated with the user identification. For example, a differential patch module 126 stored on a client device 104 may be configured to generate the request 128 in response to the notification. In other implementations, one or more patch data files 112 may be sent to the client device 104 without any user notification.

At block 716, the patch generation module 110 sends the patch data files 112 to the client device 104. For example, the patch generation module 110 may be configured to deliver patch data files 112 to the client devices 104 on a predetermined schedule, upon user 102 request, when communication is established and available, and so forth. The patch generation module 110, or another module, may be configured to verify that the client device 104 is associated with the user identification used to customize the content 114. For example, the user account data 122 may be checked to confirm that the client device 104 is registered to that user 102.

The client device 104 may receive the patch data files 112 and update the content 114 using the patch data files 112. Because the size of the patch data files 112 may be smaller than the size of the content 114, the content 114 may be changed incrementally instead of replacing the entire content 114. For example, the differential patch module 126 may be configured to update the content 114 when the size of the patch data file 112 is smaller than the size of the content 114. Accordingly, the entire content 114 would be replaced only when the size of the patch data file 112 is greater than or equal to the size of the content 114.

Figure 8:
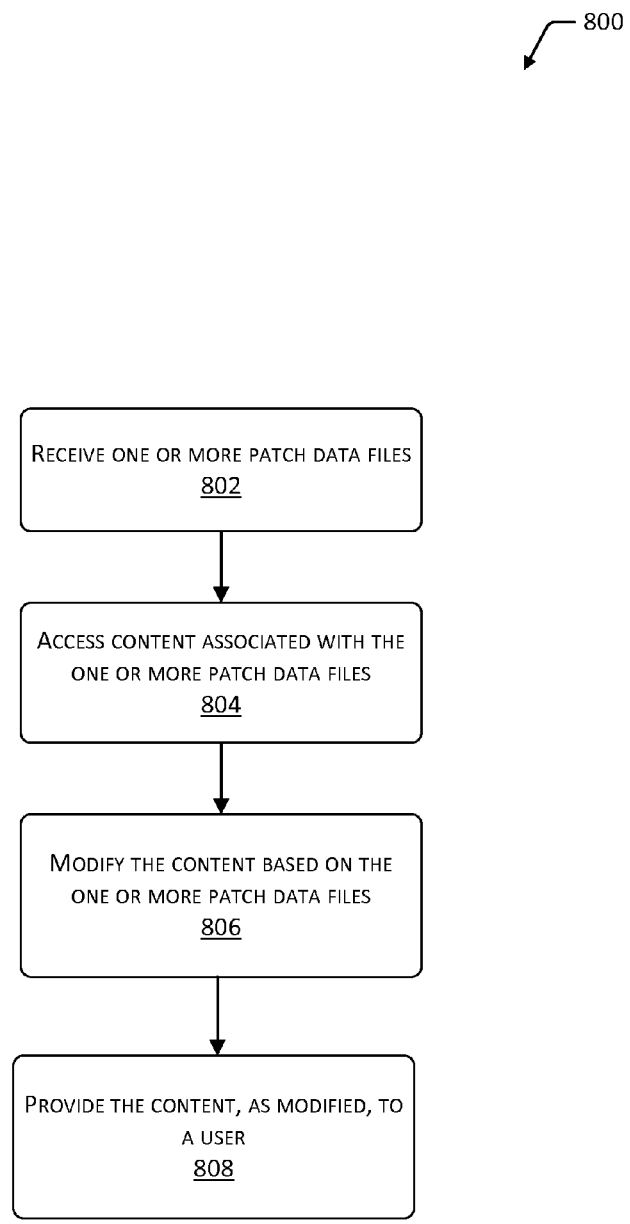
FIG. 8 depicts a flow diagram of a process of applying the one or more patch data files to the content on the client device.

FIG. 8 depicts a flow diagram 800 of a process of applying the one or more patch data files 112 to the content 114 on the client device 104. This process may be implemented at least in part by the differential patch module 126.

At block 802, one or more patch data files 112 are received. The one or more patch data files 112 are associated with the content 114. For example, the client device 104 may receive the one or more patch data files 112 from the server 108 by way of the network 106.

At block 804, the content 114 associated with the one or more patch data files 112 is accessed. For example, the patch data files 112 involving changes to the eBook "Vertebrate Anatomy" may result in the differential patch module 126 opening the files for that piece of content 114 stored in the memory 510.

At block 806, the content 114 is modified based at least in part on the one or more patch data files 112. For example, as depicted in FIG. 2, the text file 208 may be replaced with a newer version, and additional image file 214 may be inserted, and so forth. In another example, the metadata of the content 114 may be updated. These updates to metadata may add, remove, or modify access privileges to a portion of the content 114. The modified content 114 may be stored for later use, such as presentation on one or more of the I/O devices 508 of the client device 104.

At block 808, the now modified content 114, which includes the changes expressed in the patch data file 112, may be provided to the user 102. For example, the client device 104 may present on a display the updated text file, play through a speaker an updated audio file, and so forth.

The modification to the content 114 by the differential patch module 126 may be done with or without user intervention. In one implementation, a user interface may be used to present an indication that the one or more patch data files 112 are available. For example, a dialog box may be presented on the display or an audio prompt played from the speaker. In this implementation, the modifying may be based at least in part on receipt of user input indicative of acceptance to apply the patch data files 112. For example, the user 102 selecting "yes" responsive to the dialog box may result in the patch data files 112 being processed into the content 114 using the differential patch module 126.

The sending of the one or more patch data files 112 may be based at least in part on an update threshold. The update threshold sets a limit at which point the patch data files 112 may be sent to the client device 104. The update threshold may be expressed as one or more of bytes transferred, date, elapsed time, count of changes, portion of the content 114 affected by the updates, and so forth. For example, the update threshold may be configured to send the one or more patch data files 112 so long as the patch data files 112 do not exceed a certain maximum size. In one implementation, the patch generation module 110 may determine the one or more patch data files 112 have a total byte size during transfer which is less than the update threshold. Because the one or more patch data files 112 are below the threshold, the patch data files 112 may be sent to the client device 104.

In another example, the update threshold may be set to only send updates every calendar month. The process may involve determination that the one or more patch data files 112 meet or exceed the update threshold. Based at least in part on meeting or exceeding the update threshold, the one or more patch data files 112 may then be sent to the client device 104.

Using these techniques, updates to the content 114 may be made quickly and efficiently. Instead of re-delivering the entire content 114, selected portions of the content 114 are sent and changed.

Figure 9:
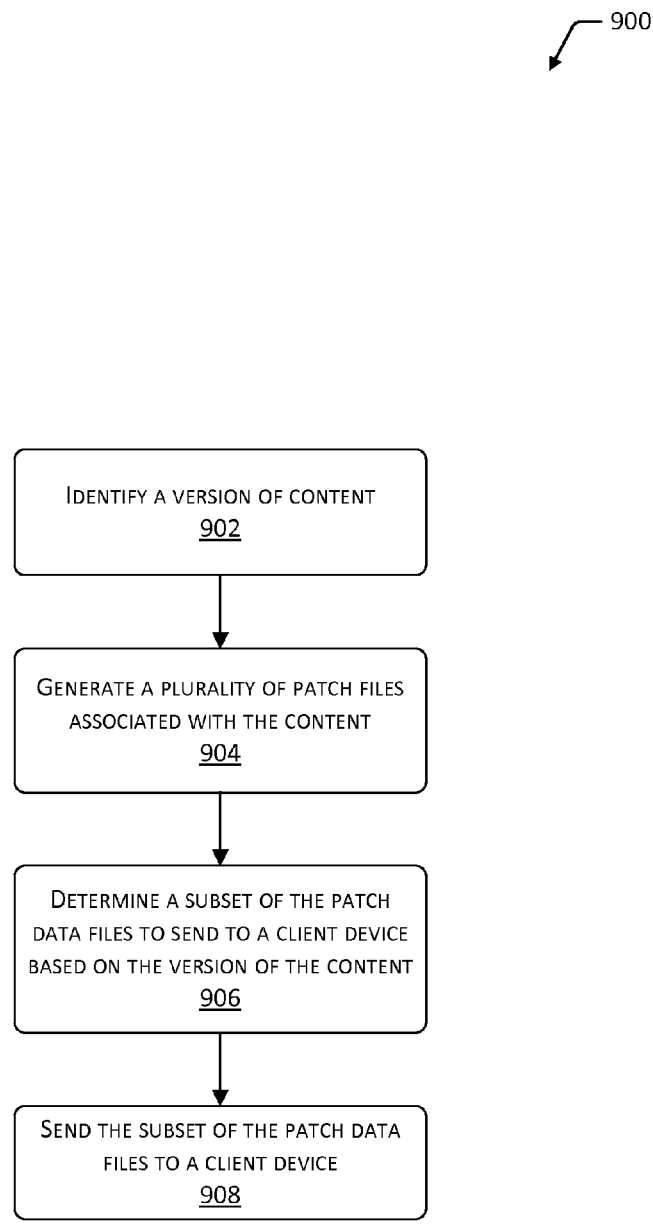
FIG. 9 depicts a flow diagram of a process of generating and sending a subset of patch data files.

FIG. 9 depicts a flow diagram 900 of a process by the patch generation module 110 to select a subset of the one or more patch data files 112 to provide to the client device 104. In some implementations, it may be infeasible or undesirable to send patch data files 112 for every change, no matter how small. The process described in this figure may be used to selectively distribute patch data files 112 to the client device 104.

At block 902, the patch generation module 110 may be configured to identify a version corresponding to the content 114 to be updated on the client device 104. For example, the version data 118 associated with the content 114 on the client device 104 may be retrieved.

At block 904, the patch generation module 110 may be configured to generate a plurality of patch data files 112 associated with the version of the content 114. For example, for each version of content 114, patch data files 112 may be generated that include corrections to formatting errors, changes to the associated metadata such as description, price, author name, and so forth. As content updates 116 are received, the corresponding patch data files 112 may be stored in memory.

At block 906, a subset of the plurality of patch data files 112 are determined for sending to the client device 104. This subset may be based on the version of the content 114 or other data. For example, the subset may include all patch data files 112 associated with bringing version "1.1" of the eBook "Vertebrate Anatomy" up to version "1.2".

In one implementation, the subset may be based on file transfer size constraints, such as a minimum file transfer size, a maximum file transfer size, or both. For example, the subset may accumulate changes until reaching a particular size is reached, at which time the subset is distributed to the client devices 104. In another implementation, the subset may be based on a time since last update. For example, the patch data files 112 may be generated monthly for distribution.

At block 908, the patch generation module 110 sends the subset of patch data files 112 to the client device 104. For example, the server 108 may use the network 106 to transfer the subset of patch data files 112 to the client device 104.

As described above, upon receipt, the differential patch module 126 of the client device 104 may be configured to update the content 114 based on the subset of the patch data files 112. For example, the eBook may be updated to the version "1.2".

The examples in this disclosure refer to the differential patch module 126 executing and making changes to the content 114 as stored on the client device 104. However, it is understood that in other implementations the differential patch module 126 and the associated functions may be implemented on other devices. For example, the differential patch module 126 may execute on a content caching server, such that cached piece of the content 114 is updated using the patch data files 112.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A computer-readable storage medium storing instructions, which when executed by a processor perform actions comprising:
   identifying a first version of content stored on a client device, wherein the content includes an electronic document;
   determining one or more content updates associated with the first version of the content;
   determining a user identification associated with the client device;
   accessing data associated with the user identification;
   generating one or more differential patch data files configured to modify the stored content based on at least one of:
      the one or more content updates, or
      the data associated with the user identification; and
   applying the one or more differential patch data files to the first version of content to produce a second version of the content, wherein the applying the one or more differential patch data files includes generating metadata associated with the first version of content; and wherein a total file size of the one or more differential patch data files is less than a total file size of the first version of the stored content.

2. The computer-readable storage medium of claim 1, wherein the data associated with the user identification comprises one or more of the following:
   a username;
   a password;
   an access code, wherein the access code is configured to enable access to one or more additional features associated with the content;
   a watermark; or
   a message.

3. The computer-readable storage medium of claim 1, wherein the one or more differential patch data files are configured to modify previously stored metadata associated with the content stored on the client device.

4. A computer implemented method comprising:
   storing first content in memory;
   receiving one or more differential patch data files associated with the first content;
   generating metadata associated with the first content;
   accessing the first content associated with the one or more differential patch data files;
   generating second content based at least in part on the first content and the one or more differential patch data files; and
   presenting at least a portion of the second content on a client device.

5. The computer implemented method of claim 4, wherein the generating the second content includes modifying a set of metadata associated with the first content.

6. The computer implemented method of claim 4, further comprising:
   the generating the second content further comprising removing information from the first content.

7. The computer implemented method of claim 4, further comprising:
   determining that a portion of the first content is currently being accessed by the client device; and
   the generating the second content including modifying portions of the first content that are not currently being accessed using the one or more patch data files.

8. The computer implemented method of claim 4, further comprising:
   the generating the second content comprising modifying, with the one or more differential patch data files, at least a portion of the first content currently being accessed by the client device.

9. The computer implemented method of claim 4, further comprising:
   storing a plurality of versions of one or more of the first content or the second content; and
   wherein the one or more differential patch data files are associated with a particular subset of the plurality of versions.

10. The computer implemented method of claim 4, further comprising:
    determining a network to use to send the one or more differential patch data files based at least in part on one or more of the following:
       a set of time-sensitive data associated with the one or more differential patch data files;
       a network speed;
       a network latency; or
       a network transmission cost.

11. The computer implemented method of claim 4, further comprising:
    determining a position of presentation within the first content associated with a user account;
    storing the position; and
    maintaining the position in the second content.

12. The computer implemented method of claim 4, further comprising:
    determining one or more user annotations within the first content; and
    maintaining the one or more user annotations in the second content.

13. The computer implemented method of claim 4, wherein the client device is configured to generate and provide the one or more differential patch data files to another client device.

14. The computer implemented method of claim 4, further comprising:
    presenting in a user interface an indication the one or more differential patch data files are available; and
    wherein the generating the second content is based at least in part on receipt of user input indicative of acceptance to apply the one or more differential patch data files.

15. A system comprising:
    a first computing device comprising:
    at least one processor; and
    at least one memory, the at least one memory storing instructions configured for execution on the at least one processor, the instructions configured to:
       store content in the at least one memory;
       generate one or more differential patch data files to modify at least metadata associated with the content;
       determine an update threshold associated with the one or more differential patch data files has been reached; and
       send the one or more differential patch data files to a plurality of client devices.

16. The system of claim 15, the client device comprising:
    at least one processor; and
    at least one memory, the at least one memory storing instructions configured for execution on the at least one processor, the instructions configured to:
       receive the one or more differential patch data files; and
       modify at least a portion of metadata associated with the content stored in the at least one memory of the client device.

17. The system of claim 15, the client device comprising:
    at least one processor; and
    at least one memory, the at least one memory storing instructions configured for execution on the at least one processor, the instructions configured to:
    receive the one or more differential patch data files; and
    modify at least a portion of the content stored in the at least one memory of the client device.

18. The system of claim 15, the client device comprising:
    at least one processor; and
    at least one memory, the at least one memory storing instructions configured for execution on the at least one processor, the instructions configured to:
       generate at least a portion of the one or more differential patch data files; and
       send the at least a portion of the one or more differential path data files to the first computing device.

19. The system of claim 15, wherein the content comprises a markup language file and further wherein the one or more differential patch data files are configured to add, remove, or add and remove one or more words from the markup language file stored on the plurality of client devices.

20. The system of claim 15, the first computing device further comprising instructions configured to:
   determine an access code associated with the client device, wherein the access code enables access to one or more additional features associated with the content; and
wherein the generated one or more differential path data files are based at least in part on the access code.

* * * * *